United States Patent
Kwon et al.

(10) Patent No.: US 8,102,820 B2
(45) Date of Patent: Jan. 24, 2012

(54) METHOD AND APPARATUS FOR TRANSMITTING/RECEIVING DATA CONTROL CHANNEL IN A PACKET DATA COMMUNICATION SYSTEM

(75) Inventors: Hwan-Joon Kwon, Hwaseong-si (KR); Dong-Hee Kim, Yongin-si (KR); Jae-Chon Yu, Suwon-si (KR); Jin-Kyu Han, Seoul (KR); Yu-Chul Kim, Seoul (KR)

(73) Assignee: Samsung Electronics Co., LTD (KR)

( * ) Notice: Subject to any disclaimer, the term of this patent is extended or adjusted under 35 U.S.C. 154(b) by 962 days.

(21) Appl. No.: 11/788,382

(22) Filed: Apr. 19, 2007

(65) Prior Publication Data

US 2008/0019327 A1 Jan. 24, 2008

(30) Foreign Application Priority Data

Apr. 19, 2006 (KR) ........................ 10-2006-0035523

(51) Int. Cl.
*H04J 3/00* (2006.01)
(52) U.S. Cl. ...................... 370/336; 455/435.1; 455/450; 455/451; 455/452.1; 455/452.2; 370/310; 370/468
(58) Field of Classification Search ............... 455/435.1, 455/450–452.2; 370/336, 310, 468
See application file for complete search history.

(56) References Cited

U.S. PATENT DOCUMENTS

| | | | | |
|---|---|---|---|---|
| 4,736,371 | A * | 4/1988 | Tejima et al. ................. | 370/236 |
| 6,301,514 | B1 * | 10/2001 | Canada et al. ................ | 700/108 |
| 6,430,163 | B1 * | 8/2002 | Mustajarvi ..................... | 370/310 |
| 6,560,243 | B1 * | 5/2003 | Mogul ........................... | 370/468 |
| 6,628,945 | B1 * | 9/2003 | Koorapaty et al. ........... | 455/434 |
| 7,542,443 | B2 * | 6/2009 | Singvall et al. ............... | 370/328 |
| 2004/0047293 | A1 * | 3/2004 | Arrakoski ...................... | 370/236 |
| 2004/0093548 | A1 | 5/2004 | Heo et al. | |
| 2004/0266466 | A1 * | 12/2004 | Kim et al. ...................... | 455/509 |
| 2005/0058149 | A1 * | 3/2005 | Howe ............................ | 370/428 |
| 2005/0122898 | A1 * | 6/2005 | Jang et al. ..................... | 370/218 |
| 2005/0243793 | A1 | 11/2005 | Kim et al. | |
| 2006/0280256 | A1 | 12/2006 | Kwon et al. | |
| 2007/0140254 | A1 * | 6/2007 | Tuppa ......................... | 370/395.4 |
| 2007/0184842 | A1 * | 8/2007 | Pedersen et al. .............. | 455/450 |
| 2008/0084851 | A1 * | 4/2008 | Kim et al. ...................... | 370/336 |

* cited by examiner

*Primary Examiner* — Rafael Pérez-Gutiérrez
*Assistant Examiner* — Lameka J. Kirk
(74) *Attorney, Agent, or Firm* — The Farrell Law Firm, P.C.

(57) ABSTRACT

A method for transmitting/receiving a data control channel in a wireless communication system that transmits packet data. The transmission method includes transmitting packet data over a packet data channel, transmitting a control channel and receiving an ACKnowledgement (ACK) signal from a terminal that has received the control channel. The reception method includes receiving packet data and a control channel, acquiring control information by demodulating the control channel, and detecting an error in the control channel, and sending the error detection result to a base station as an ACK signal, if the control channel has been transmitted to the terminal itself.

4 Claims, 8 Drawing Sheets

METHOD AND APPARATUS FOR TRANSMITTING/RECEIVING DATA CONTROL CHANNEL IN A PACKET DATA COMMUNICATION SYSTEM

PRIORITY

This application claims priority under 35 U.S.C. §119(a) to a Korean Patent Application filed in the Korean Intellectual Property Office on Apr. 19, 2006 and assigned Serial No. 2006-35523, the contents of which are incorporated herein by reference.

BACKGROUND OF THE INVENTION

1. Field of the Invention

The present invention relates generally to a method and apparatus for transmitting/receiving a data control channel in a packet data communication system, and in particular, to a method and apparatus for transmitting/receiving a data control channel for transmitting Persistent Resource Allocation information.

2. Description of the Related Art

In a conventional packet data communication system, a resource allocation scheme is classified into a Persistent and a Non-Persistent Resource Allocation scheme. The 'resource' is subject to change according to type of the communication system. For example, the resources can be codes in a Code Division Multiple Access (CDMA) system, frequency bands in a Frequency Division Multiple Access (FDMA) system, sub-carriers in an Orthogonal Frequency Division Multiple Access (OFDMA) system and time slots in a Time Division Multiple Access (TDMA) system.

Of the resources, the sub-carriers belong to frequency. In the following description, therefore, both the sub-carrier resources and the frequency band resources will be referred to as "frequency resources." There can be a possible communication system supporting all of CDMA, FDMA, OFDMA and TDMA. In this case, the resources can include all of the codes, frequencies and time slots. In the following description, therefore, the resources can include all or some of the codes, sub-carriers and time slots, and this is subject to change according to the system.

Generally, the Persistent Resource Allocation scheme regards persistent allocation of an amount of Persistent Resource Allocation resources to one user, which resources are generally persistently valid unless the scheme newly changes the resources once allocated by a base station. However, the Non-Persistent Resource Allocation scheme regards a new allocation of resources per time slot or per a number of time slots.

FIG. 1 illustrates a conventional Persistent Resource Allocation scheme and Non-Persistent Resource Allocation scheme.

Referring to FIG. 1, the horizontal axis indicates time resources, and the vertical axis indicates frequency or code resources. Therefore, in the system shown in FIG. 1, the resources include frequencies, codes and time slots. That is, the system in FIG. 1 can be a system that allocates the frequency or code resources indicated by the vertical axis and the time slot resources indicated by the horizontal axis to different users every time slot 101. In FIG. 1, a data channel 102 indicates a physical channel for transmitting user data, and a data control channel 103 indicates a physical channel for transmitting control information necessary for data demodulation.

Generally, the data control channel 103 is referred to as, for example, Shared Control CHannel (SCCH), Data Control CHannel (DCCH) or Shared Signaling CHannel (SSCH), according to system. The data control channel serves to provide scheduling information to terminals, data transmission or resource allocation to which is scheduled, for every time slot interval. That is, all terminals in the system can receive the data control channel transmitted from the base station every slot, detect terminal identifier information included in the data control channel, and determine whether there are resources allocated to them by checking whether the detected terminal identifier information is equal to their own terminal identifier information.

The data control channel 103 can include various control information as well as the terminal identifier information according to other uses. However, because this is not related to the present invention, a detailed description thereof will be omitted. Although the resources over which the data channel 102 is transmitted and the resources over which the data control channel 103 is transmitted are divided on the vertical axis in FIG. 1 for convenience, it is not necessary that the resources be divided in this manner. In addition, numerals shown in the time axis of FIG. 1 indicate indexes 104 for time slots.

The Persistent Resource Allocation and Non-Persistent Resource Allocation schemes will now be described in detail with reference to FIG. 1. Numerals '1' to '5' in the shaded boxes are for user identification. It is assumed herein that Persistent Resource Allocation is performed for the users indicated by '1', and Non-Persistent Resource Allocation is performed on the other parts (users) indicated by '2' to '5'. On this assumption, for the parts indicated by '1', Persistent Resource Allocation resources are allocated to the corresponding user and the data control channel 103 is transmitted together with data transmission at a time slot #1. In addition, the data control channel 103 transmitted at the time slot #1 includes not only the terminal identifier of the corresponding user, but also the information indicating Persistent Resource Allocation. For example, 1 bit is used herein for the information indicating Persistent Resource Allocation (hereinafter indication bit). Herein, indication bit='1' indicates Persistent Resource Allocation, and indication bit='0' indicates Non-Persistent Resource Allocation. All terminals in the system can detect the terminal identifier and the indication bit indicating Persistent Resource Allocation by receiving and demodulating the data control channel 103 transmitted at the time slot #1.

The terminals determine whether a terminal identifier received over the data control channel 103 is equal to their own terminal identifiers. Because the terminal identifier included in the data control channel 103 at the time slot #1 is a terminal identifier of the user indicated by, for example, '1', terminals of the users indicated by the other terminal identifiers '2' to '5' except for the corresponding terminal identifier go to the next time slot, considering that there is no resource allocated to them.

However, the user indicated by '1' recognizes that there are resources allocated to him/her, because his/her own terminal identifier has been received. The user then determines whether the resources allocated at this time are Persistent Resource Allocation resources or Non-Persistent Resource Allocation resources depending on an indication bit for Persistent Resource Allocation (hereinafter Persistent Resource Allocation indication bit). Because the Persistent Resource Allocation indication bit transmitted at time slot #1 is '1', the terminal can recognize that the resources allocated at time slot #1 are Persistent Resource Allocation resources allocated to the terminal itself. Although only one code or frequency resource is allocated to data channel 102 in FIG. 1 for convenience, it should be noted that multiple code resources and frequency resources are actually allocated.

Therefore, the data control channel 103 generally includes information indicating the amount of allocated resources. The Persistent Resource Allocation resources allocated at time slot #1 include code or frequency resources and time slot resources. That is, the data control channel 103 includes information indicating which code or frequency resources it will allocate on a Persistent Resource Allocation basis per number of time slots. It is assumed in FIG. 1 that Persistent Resource Allocation resources are allocated to the user indicated by '1' at the time slot #1 in the time axis every four time slots. Therefore, in the example of FIG. 1, the Persistent Resource Allocation resources for the user indicated by '1' are applied to time slots #1, #5, #9, #13, etc.

An example of Non-Persistent Resource Allocation will now be described. It can be noted that a data channel 102 and a data control channel 103 are transmitted at a time slot #2. The data control channel 103 includes a terminal identifier for the user indicated by '2' and a Persistent Resource Allocation indication bit='0'. Therefore, a base station transmits data to the user indicated by '2' over the data channel 102, together with the data control channel 103. The resources allocated at the corresponding time slot are Non-Persistent Resource Allocation resources, and therefore is resource allocation applied only to the corresponding time slot.

Similarly, it can be noted in FIG. 1 that a data channel 102 and a data control channel 103 are retransmitted at a time slot #3. The data control channel 103 includes a terminal identifier for the user indicated by '3' and Persistent Resource Allocation indication bit='0'. Therefore, the base station transmits data to the user indicated by '3' over the data channel 102, together with the data control channel 103. That is, Non-Persistent Resource Allocation is applied only to the time slot. As time passes in the time slots #4, #5, #6, . . . , the base station continues to perform Persistent Resource Allocation or Non-Persistent Resource Allocation per time slot.

As described above, in the example of FIG. 1, the resources of the time slots #1, #5, #9, #13, . . . are Persistent Resource Allocation resources allocated to the user indicated by '1', and the other resources except for the Persistent Resource Allocation resources are allocated as Non-Persistent Resource Allocation resources. As for the Persistent Resource Allocation, it should be noted that the data control channel 103 is generally transmitted only for initial Persistent Resource Allocation as shown in FIG. 1. That is, after signaling to the terminal the information indicating that specific resources are allocated on a Persistent Resource Allocation basis, the base station does not transmit a data control channel unless it intends to release the previously allocated Persistent Resource Allocation resources or it intends to change the amount or positions of the Persistent Resource Allocation resources. This is an important difference from Non-Persistent Resource Allocation, and can be verified through FIG. 1. That is, in FIG. 1, as to the time slots #1, #5, #9, #13, . . . , the data control channel is transmitted only at the first time slot #1, and the data control channel is no longer transmitted to the corresponding user (see reference numerals 111, 113 and 115). However, the data control channel is transmitted together with the data channel at all the other time slots, i.e. the time slots where Non-Persistent Resource Allocation is performed.

Therefore, it can be noted that a data control channel used for transmitting Persistent Resource Allocation information is much more important than a data control channel used for Non-Persistent Resource Allocation information. If a data control channel over which Persistent Resource Allocation information is transmitted suffers from an error in a transmission process, an influence of the error continues, greatly affecting the entire system performance. However, in the conventional communication system, the data control channel for transmitting Persistent Resource Allocation information and the data control channel for transmitting Non-Persistent Resource Allocation information are equal in transmission/reception structure and process, thereby causing a reduction in reception reliability of the data control channel for transmitting Persistent Resource Allocation information.

SUMMARY OF THE INVENTION

An aspect of the present invention is to address at least the problems and/or disadvantages and to provide at least the advantages described below. Accordingly, an aspect of the present invention is to provide a data control channel transmission/reception method and apparatus capable of improving reception reliability of a data control channel for transmitting Persistent Resource Allocation information in a packet data communication system.

According to an aspect of the present invention, there is provided a method for transmitting a data control channel in a wireless communication system that transmits packet data. The transmission method includes transmitting packet data over a packet data channel, transmitting a control channel and receiving an ACKnowledgement (ACK) signal from a terminal that has received the control channel.

According to an aspect of the present invention, there is provided a method for receiving a data control channel in a wireless communication system that transmits packet data. The reception method includes receiving packet data and a control channel, acquiring control information by demodulating the control channel, and detecting an error in the control channel, and sending the error detection result to a base station as an ACK signal, if the control channel has been transmitted to a terminal.

According to an aspect of the present invention, there is provided an apparatus for transmitting a data control channel in a wireless communication system that transmits packet data. The transmission apparatus includes a scheduler for determining resource allocation and a transmission time for a plurality of terminals, a data control channel transmission block for transmitting a data channel according to the determination result; and an ACK signal reception block for receiving an ACK signal from a terminal that has received the control channel.

According to an aspect of the present invention, there is provided an apparatus for receiving a data control channel in a wireless communication system that transmits packet data. The reception apparatus includes a data control channel reception block for acquiring control information indicating presence/absence of error in a control channel by receiving and demodulating packet data and the control channel, an ACK signal transmission block for sending the presence/absence of error in the control channel to a base station as an ACK signal, and a controller for generating an ACK signal according to the presence/absence of error in the control channel, and controlling transmission of the ACK signal.

According to an aspect of the present invention, there is provided a method for transmitting a data control channel in a wireless communication system that transmits packet data. The transmission method includes scheduling resource allocation for a plurality of terminals; and repeatedly transmitting to a wireless network a data control channel including persistent resource allocation information a set number of times.

According to an aspect of the present invention, there is provided a method for receiving a data control channel in a packet data communication system. The reception method includes receiving and storing a data control channel including persistent resource allocation information a set number of times; if demodulation of the data control channel fails, combining at least one data control channel received at a previous slot, and re-performing demodulation on the combined data control channel, and acquiring control information for reception of a data channel depending on the demodulated data control channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for the sake of clarity and conciseness. Although a description of resource allocation and user data transmission will be limited herein to a forward link, i.e. data transmission from a base station to a terminal, the present invention can also be applied to reverse resource allocation and reverse data transmission in the same manner.

In a first embodiment of the present invention, if a received data control channel includes Persistent Resource Allocation information, a terminal sends an ACK to a base station over a reverse ACK Channel (ACKCH). If the base station that transmitted the data control channel including Persistent Resource Allocation information, failed to receive an ACK for the data control channel including Persistent Resource Allocation information from the terminal to which it has allocated Persistent Resource Allocation resources, the base station retransmits the data control channel including Persistent Resource Allocation information.

In a second embodiment of the present invention, a base station repeatedly transmits, N times, control information including Persistent Resource Allocation information over a data control channel, but does not repeatedly transmit Non-Persistent Resource Allocation information. A value of the N is previously set between the base station and the terminal. The second embodiment discloses a data control channel reception operation of the terminal.

First Embodiment

As described above, in the first embodiment of the present invention, when a received data control channel includes Persistent Resource Allocation information, a terminal sends ACK/NACK over a reverse ACKCH.

Figure 1:
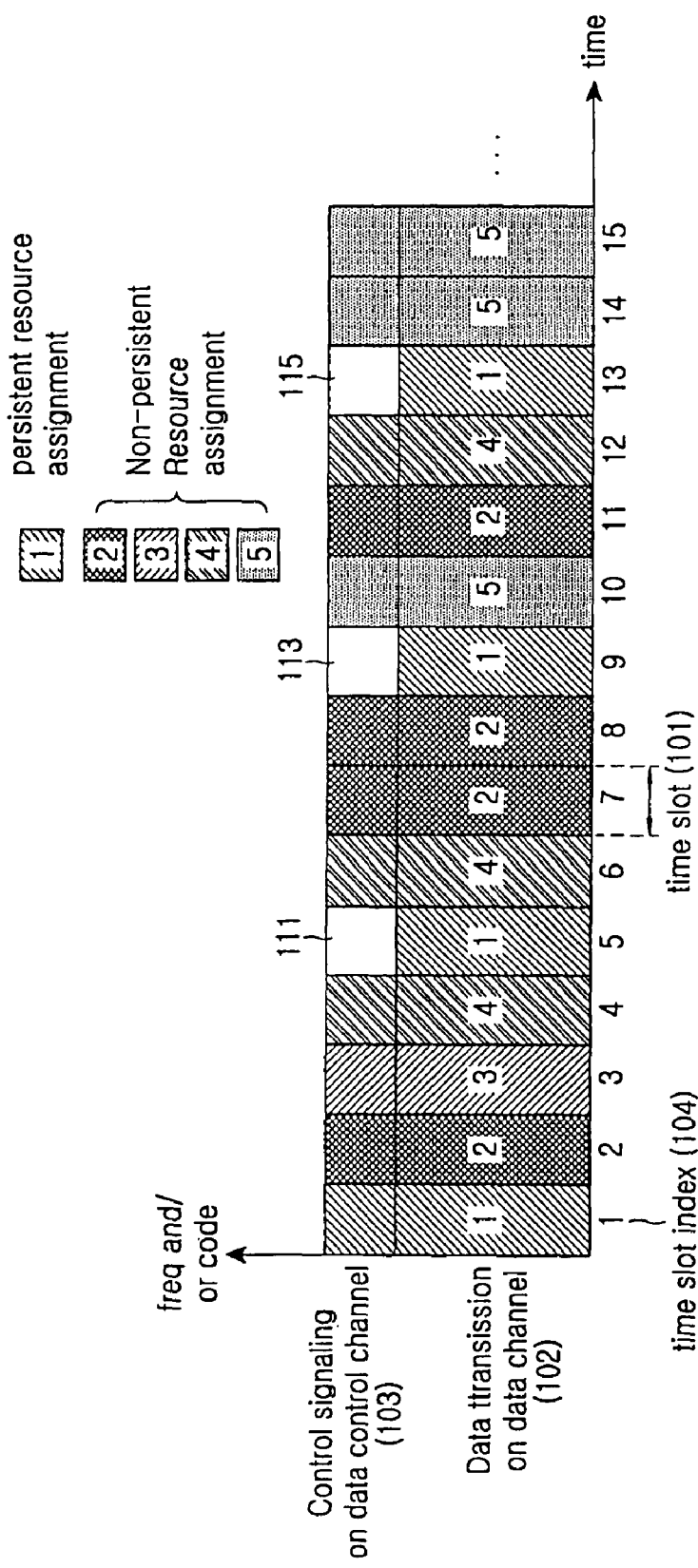
FIG. 1 illustrates an example of Persistent Resource Allocation and Non-Persistent Resource Allocation in a conventional packet data communication system.
Figure 2:
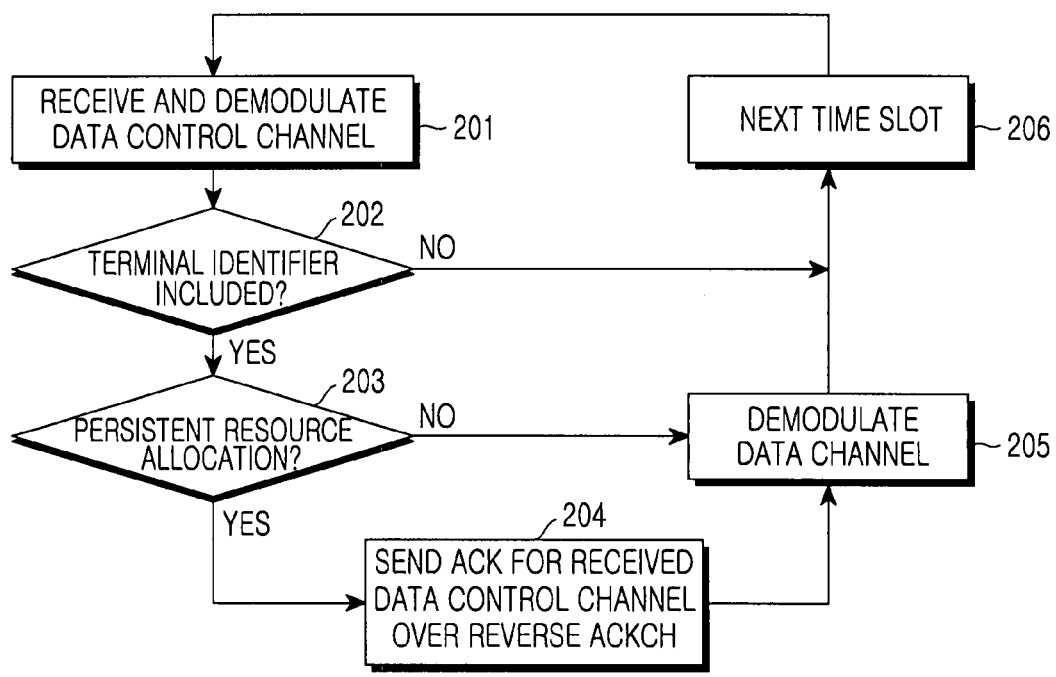
FIG. 2 illustrates a method of receiving a data control channel in a packet data communication system according to a first embodiment of the present invention.

FIG. 2 illustrates a method of receiving a data control channel in a packet data communication system according to the first embodiment of the present invention. Shown in FIG. 2 is a reception operation of a terminal.

Referring to FIG. 2, in step 201, a terminal receives a data control channel, and acquires control information by demodulating the received data control channel. The control information includes terminal identifier, resource allocation information, and an indicator indicating Persistent Resource Allocation/Non-Persistent Resource Allocation. In step 202, the terminal determines whether terminal identifier information in the control information acquired in step 201 is the same as its own predefined terminal identifier. If it is determined in step 202 that the acquired terminal identifier is different from its own terminal identifier, the terminal proceeds to the next time slot without performing a data channel demodulation process in step 206, and repeats the operation of step 201 where it receives a data control channel. However, if it is determined in step 202 that the terminal identifier acquired from the control information is to the same as its own terminal identifier, the terminal determines in step 203 whether the resources allocated to it are Persistent or Non-Persistent Resource Allocation resources, considering that there are resources allocated to the terminal itself.

If it is determined in step 203 that the allocated resources are not Persistent Resource Allocation resources, the terminal immediately proceeds to step 205 where it receives and demodulates a data channel using the received control information, considering that this resource allocation is applied to only the corresponding time slot. Thereafter, the terminal proceeds to the next slot and repeats the operation of step 201. However, if it is determined in step 203 that the allocated resources are Persistent Resource Allocation resources, the terminal sends an ACK for the data control channel to a base station over an ACKCH in step 204. Thereafter, the terminal proceeds to step 205 where it receives and demodulates a data channel using the received control information. The terminal then proceeds to the next slot, and repeats the operation of step 201.

Figure 3:
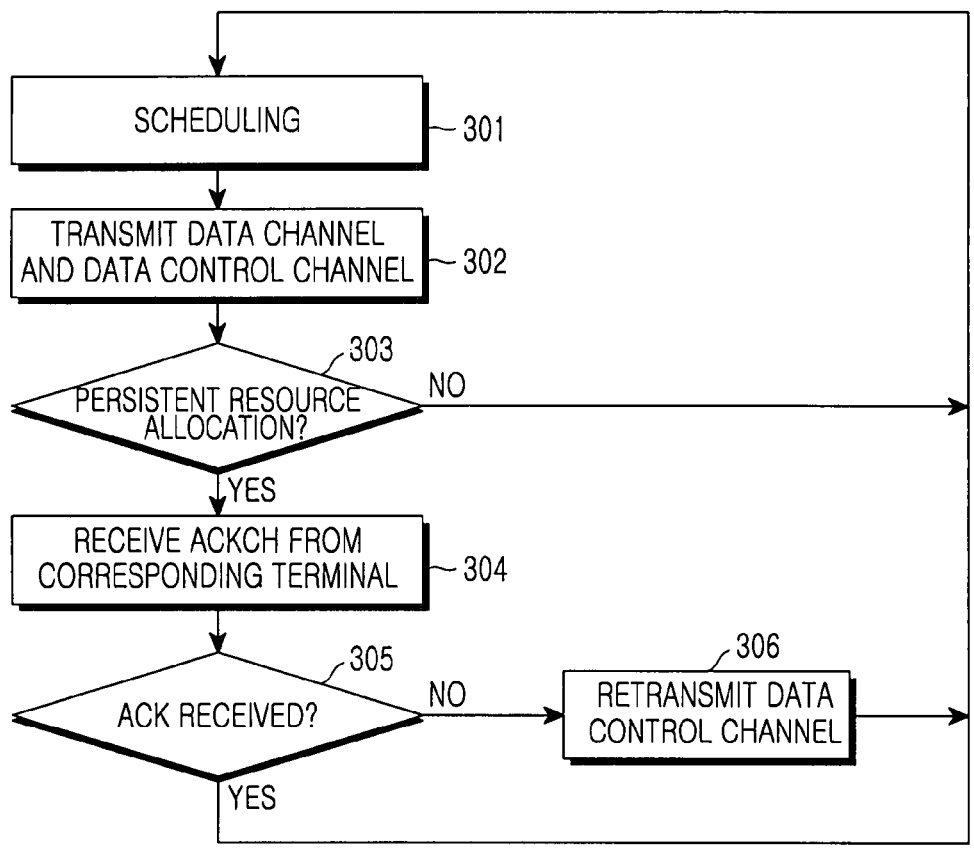
FIG. 3 illustrates a method of transmitting a data control channel in a packet data communication system according to the first embodiment of the present invention.

FIG. 3 illustrates a method of transmitting a data control channel in a packet data communication system according to the first embodiment of the present invention. Shown in FIG. 3 is a transmission operation of a base station.

In step 301, a base station performs scheduling according to a set procedure. The base station performs the scheduling to determine to which user it will allocate a number of resources at the corresponding time slot, or to determine whether the allocated resources are Persistent Resource Allocation resources. In step 302, the base station transmits a data channel and a data control channel to a wireless network according to the scheduling result. The data control channel includes terminal identifier, resource allocation information and an indicator of whether a corresponding resource allocation scheme is Persistent Resource Allocation or Non-Persistent Resource Allocation. In step 303, the base station determines whether the allocated resources are Persistent Resource Allocation resources. If the allocated resources are not Persistent Resource Allocation resources, the base station proceeds to the next time slot and repeats' step 301 and its successive steps.

However, if the allocated resources are Persistent Resource Allocation resources, the base station receives in step 304 an ACK signal over an ACKCH from the selected terminal, i.e. the terminal that has been allocated the Persistent Resource Allocation resources. The receipt of the ACKCH in step 304 can be achieved after a lapse of a time slot from the time slot at which the transmission of the data channel and the data control channel was performed. In step 305, after demodulating the received ACKCH, if the base station determines that an ACK has been received from the terminal that was allocated the Persistent Resource Allocation resources, the base station proceeds to the next time slot and repeats the operation of step 301 and its successive steps. However, if it is determined in step 305 that no ACK has been received, the base station proceeds to step 306 where it retransmits the data control channel that it transmitted to the terminal in step 302. Thereafter, the base station proceeds to the next time slot and repeats step 301 and its successive steps.

Figure 4:
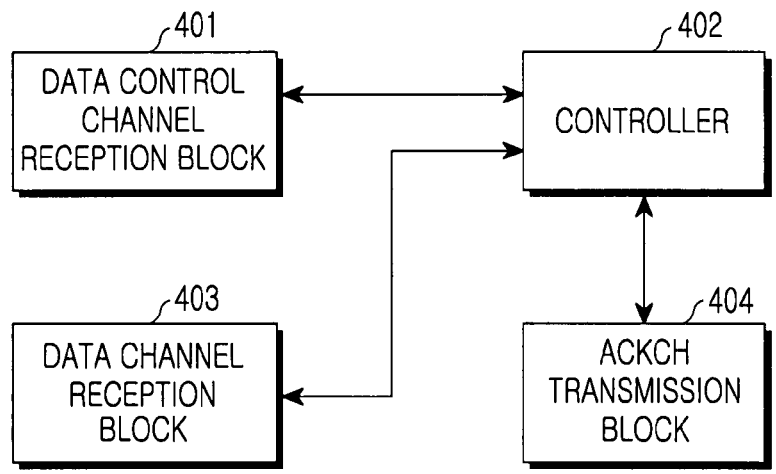
FIG. 4 illustrates a structure of a terminal to which a reception method of a data control channel according to the first embodiment of the present invention is applicable.

FIG. 4 illustrates a structure of a terminal to which a reception method of a data control channel according to the first embodiment of the present invention is applicable.

A terminal of the present invention includes a data control channel reception block 401, a data channel reception block 403, a controller 402 and an ACKCH transmission block 404. The data control channel reception block 401 receives and demodulates a data control channel according to a procedure. The output of the data control channel reception block 401, i.e. control information including terminal identifier, resource allocation information and indicator of Persistent Resource Allocation/Non-Persistent Resource Allocation, is input to the controller 402. The controller 402 controls an operation of the terminal according to the reception method of the data control channel described in FIG. 2. The data channel reception block 403, under the control of the controller 402, performs a reception and demodulation process on a data channel. As described in FIG. 2, if it is determined from the received data control channel that there are resources allocated to the terminal itself, the ACKCH transmission block 404, when the allocated resources are Persistent Resource Allocation resources, performs a function of sending an ACK to a base station, and an operation of the ACKCH transmission block 404 is performed as described in FIG. 2, under the control of the controller 402.

Figure 5:
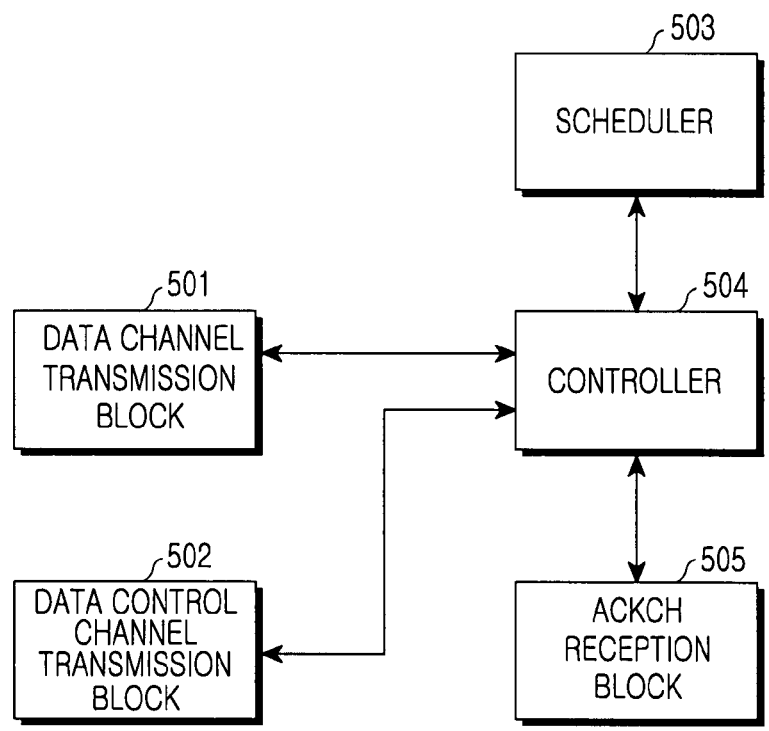
FIG. 5 illustrates a structure of a base station to which a transmission method of a data control channel according to the first embodiment of the present invention is applicable.

FIG. 5 illustrates a structure of a base station to which a transmission method of a data control channel according to the first embodiment of the present invention is applicable.

A base station of the present invention includes a data channel transmission block 501, a data control channel transmission block 502, a scheduler 503, a controller 504 and an ACKCH reception block 505. The data channel transmission block 501 transmits user data according to a procedure. The data channel transmission block 501 transmits control information for a data channel to a wireless network according to a procedure. The scheduler 503, under the control of the controller 504, performs scheduling to determine to which user it will allocate an amount of resources at the corresponding time slot, or whether the allocated resources are Persistent Resource Allocation resources according to a procedure. The ACKCH reception block 505 receives over a reverse ACKCH an ACK that the terminal which was allocated Persistent Resource Allocation resources has sent, according to a procedure. The controller 504 controls the overall operation of the data channel transmission block 501, the data control channel transmission block 502, the scheduler 503 and the ACKCH reception block 505 according to the method described in FIG. 3.

Second Embodiment

In the second embodiment of the present invention, a base station repeatedly transmits, N times, control information including Persistent Resource Allocation information over a data control channel, but does not repeatedly transmit Non-Persistent Resource Allocation information. A value of the N can be previously set between the base station and the terminal, or can be determined through signaling.

Figure 6:
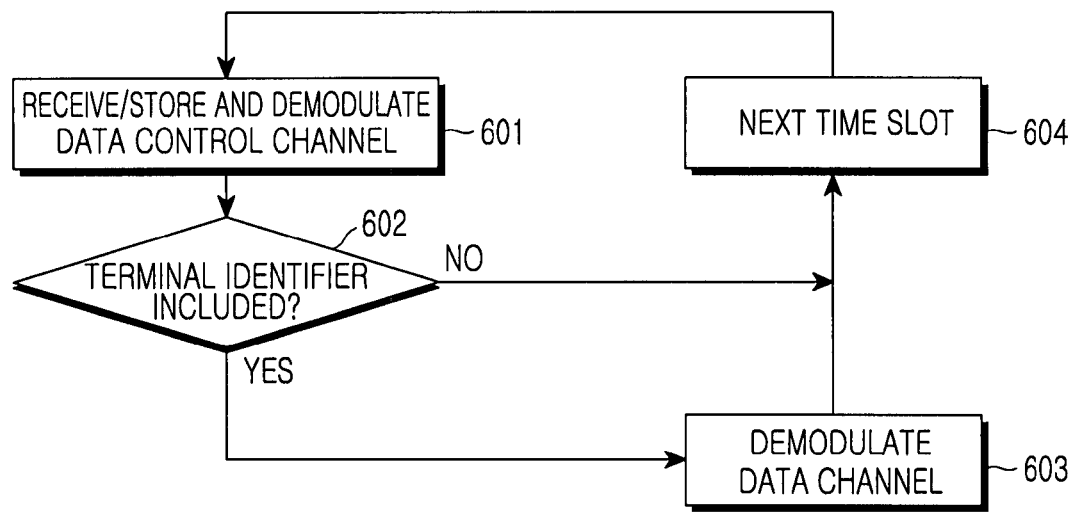
FIG. 6 illustrates a reception method of a data control channel in a packet data communication system according to a second embodiment of the present invention.

FIG. 6 illustrates a reception method of a data control channel in a packet data communication system according to the second embodiment of the present invention. Shown in FIG. 6 is a reception operation of a terminal.

In step 601, a terminal receives/stores a data control channel through a procedure a set number of times, and acquires control information by demodulating the received data control channel. The control information includes terminal identifier, resource allocation information and indicator of Persistent Resource Allocation/Non-Persistent Resource Allocation. In step 602, the terminal determines whether the terminal identifier information acquired in step 601 is to the same as its own predefined terminal identifier. If it is determined in step 602 that the acquired terminal identifier information is different from its own terminal identifier, the terminal proceeds to the next slot in step 604 without performing a data channel demodulation process, and then repeats the operation of step 601 where it receives the data control channel. However, if it is determined in step 602 that the terminal identifier acquired from the control information is the same as its own terminal identifier, the terminal receives and demodulates a data channel using the received control information in step 603, and then proceeds to the next time slot in step 604 and repeats the operation of step 601 and its successive steps.

Figure 7:
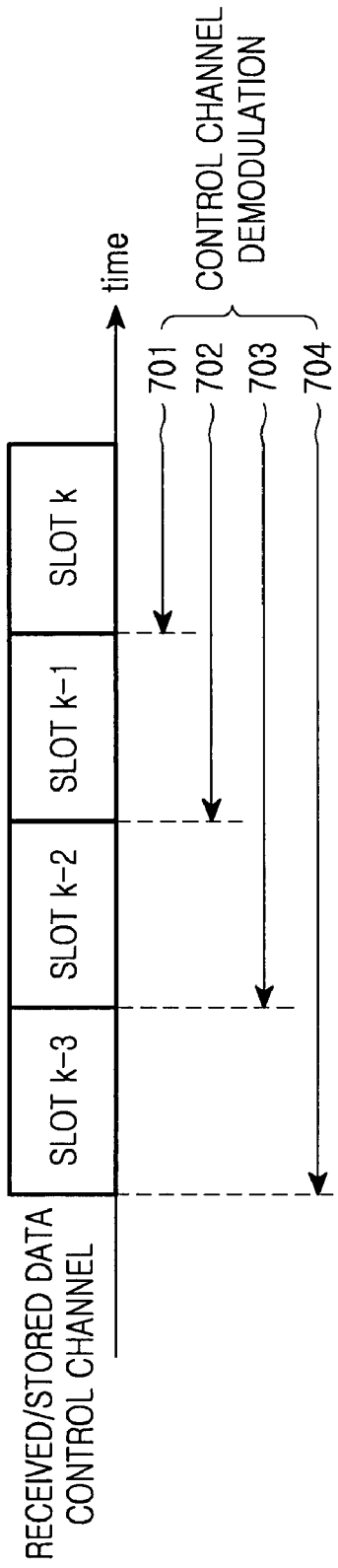
FIG. 7 illustrates an operation of a terminal that receives/stores and demodulates a repeatedly transmitted data control channel according to the second embodiment of the present invention.

FIG. 7 illustrates an operation of a terminal that receives/stores and demodulates a repeatedly transmitted data control channel according to the second embodiment of the present invention. Shown in FIG. 7 is the operation in step 601 of FIG. 6.

It will be assumed in this embodiment that a base station repeatedly transmits a data control channel four times when it performs Persistent Resource Allocation. The number of repeated transmissions for the data control channel is subject to change. FIG. 7 illustrates an operation in which a terminal receives a data control channel at a time slot #k, and the terminal previously stores the data control channel that has been transmitted four times.

In step 701, the terminal attempts demodulation through a data control channel received at a time slot #k. If the terminal succeeds in the demodulation of the data control channel (e.g., passes Cyclic Redundancy Check (CRC)) in step 701, the terminal performs the procedure of steps 602 to 604 of FIG. 6, in which it checks its own terminal identifier, demodulates a data channel and then proceeds to the next time slot. However, if the terminal fails in the demodulation of the data control channel (e.g., fails to pass CRC), the terminal combines, in step 702, the data control channels previously received at a slot #k and a slot #(k−1) according to a procedure, and reattempts demodulation on the data control channel. This procedure is repeated four times until the terminal succeeds in the demodulation of the data control channel. That is, if the terminal fails in the demodulation of the data control channel in step 702, the terminal combines, in step 703, the data control channels previously received at slots #k, #(k−1) and #(k−2), and attempts demodulation thereon. In the same manner, if the terminal fails in the demodulation of the data control channel in step 703, the terminal combines, in step 704, the data control channels previously received at slots #k, #(k−1), #(k−2) and #(k−3), and attempts demodulation thereon. The number of repeated transmission for the data control channel of the base station and the number of demodulations performed in the terminal are subject to change.

Figure 8:
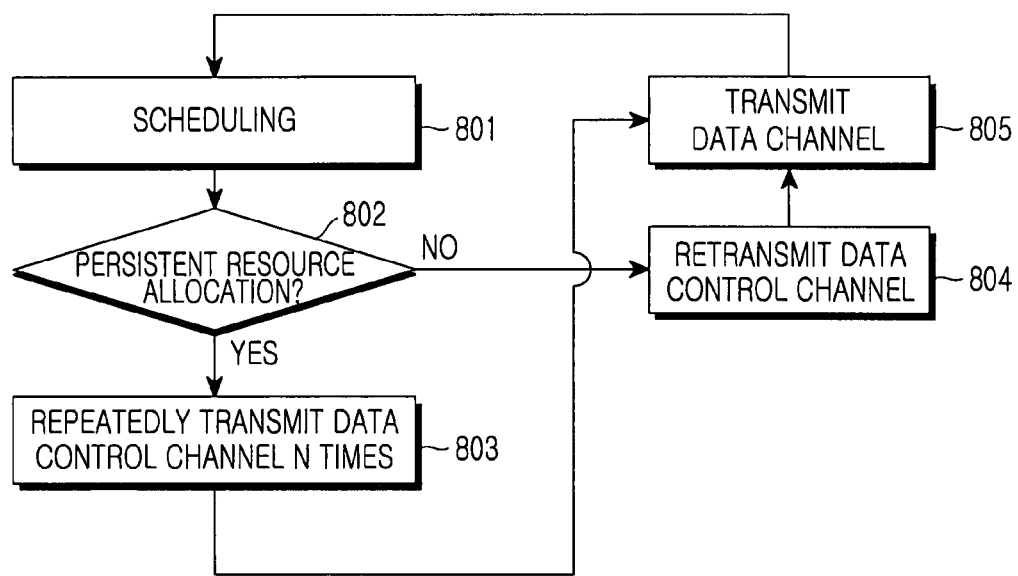
FIG. 8 illustrates a transmission method of a data control channel in a packet data communication system according to the second embodiment of the present invention.

FIG. 8 illustrates a transmission method of a data control channel in a packet data communication system according to the second embodiment of the present invention. Shown in FIG. 8 is an operation of a base station.

In step 801, a base station performs scheduling according to a procedure. The base station performs the scheduling to determine to which user it will allocate an amount of resources at the corresponding time slot, or to determine whether the allocated resources are Persistent Resource Allocation resources. In step 802, the base station determines whether the resources that it allocates at the corresponding time according to the scheduling result of step 801 are Persistent Resource Allocation resources. If the resources allocated at the corresponding time are not Persistent Resource Allocation resources, the base station transmits a data control channel in step 804, for example, only once. However, if the allocated resources are Persistent Resource Allocation resources, the base station repeatedly transmits the data control channel in step 803 a number N of times, where N is previously set with the terminal. The number of transmissions for the data control channel can also be determined through signaling with the terminal. The transmitted data control channel includes terminal identifier, resource allocation information and indicator of Persistent Resource Allocation/Non-Persistent Resource Allocation.

Thereafter, in step 805, the base station transmits a data channel to a wireless network according to a procedure, and repeatedly performs the operation of step 801 and its successive steps.

Figure 9:
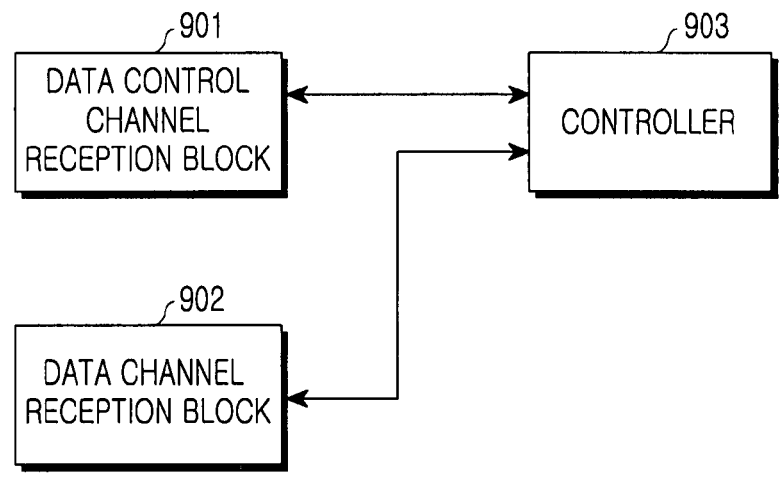
FIG. 9 illustrates a structure of a terminal to which a reception method of a data control channel according to the second embodiment of the present invention is applicable.

FIG. 9 illustrates a structure of a terminal to which a reception method of a data control channel according to the second embodiment of the present invention is applicable.

A terminal of the present invention includes a data control channel reception block 901, a data channel reception block 902 and a controller 903. The data control channel reception block 901 receives/stores and demodulates a data control channel according to a procedure a set number of times. The output of the data control channel reception block 901, i.e. control information including terminal identifier, resource allocation information and indicator of Persistent Resource Allocation/Non-Persistent Resource Allocation, is input to the controller 903. The controller 903 controls the overall operation of the terminal according to the reception method of the data control channel, described in FIGS. 6 and 7. The data channel reception block 902 performs a data channel reception and demodulation process, under the control of the controller 903.

Figure 10:
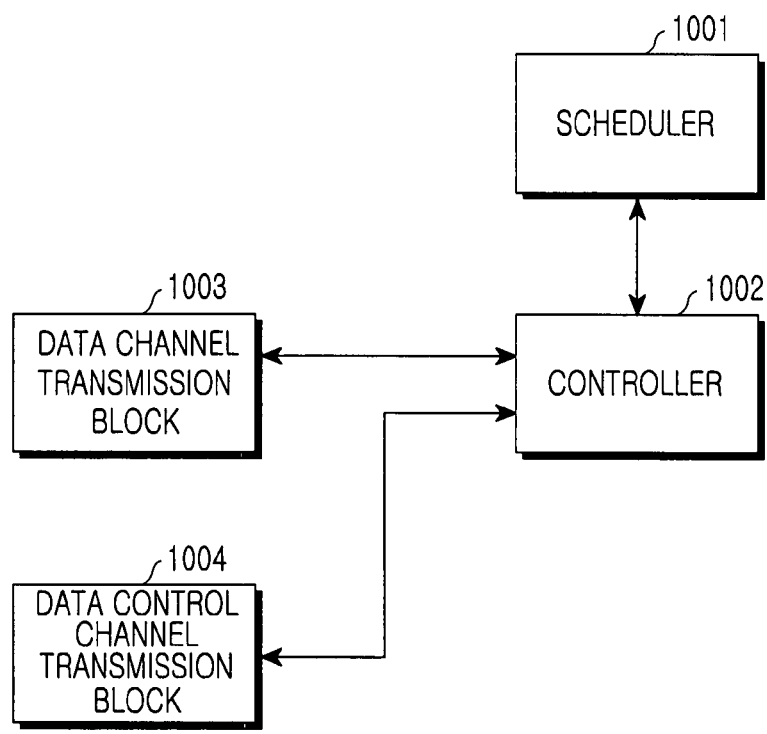
FIG. 10 illustrates a structure of a base station to which a transmission method of a data control channel according to the second embodiment of the present invention is applicable.

FIG. 10 illustrates a structure of a base station to which a transmission method of a data control channel according to the second embodiment of the present invention is applicable.

A base station of the present invention includes a scheduler 1001, a controller 1002, a data channel transmission block 1003 and a data control channel transmission block 1004. The scheduler 1001 performs scheduling to determine to which user it will allocate an amount of resources, or determining whether allocated resources are Persistent or Non-Persistent Resource Allocation resources. The data channel transmission block 1003 transmits user data according to a procedure. The data control channel transmission block 1004, under the control of the controller 1002, transmits control information for a data channel to a wireless network a number of times. The controller 1002 controls operations of the scheduler 1001, the data channel transmission block 1003 and the data control channel transmission block 1004 according to the transmission method described in FIG. 8.

As is apparent from the foregoing description, according to the present invention, the packet data communication system can reliably receive Persistent Resource Allocation information transmitted over a data control channel, thereby improving the system capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data control information in a wireless communication system that transmits packet data, the method comprising:
    transmitting packet data over a packet data channel;
    transmitting control information, including persistent resource allocation information, necessary for the packet data demodulation on a data control channel; and
    receiving an ACK/NACK signal in response to the control information including the persistent resource allocation information from a terminal that has received the control information,
    wherein the terminal does not transmit an ACK/NACK signal in response to control information including non-persistent resource allocation information,
    wherein the persistent resource allocation information indicates a corresponding resource is allocated to the terminal periodically and the non-persistent resource allocation information indicates a corresponding resource is allocated to the terminal in a slot temporarily.

2. The method of claim 1, further comprising:
    retransmitting the data control information upon failure to receive the ACK/NACK signal from the terminal.

3. An apparatus for transmitting data control information in a wireless communication system that transmits packet data, the apparatus comprising:
    a scheduler for determining resource allocation and a transmission time for a plurality of terminals;
    a data control channel transmission block for transmitting control information, including persistent resource allocation information, necessary for a packet data demodulation on a data control channel according to a result of the determination; and
    an ACK/NACK signal reception block for receiving an ACK/NACK signal in response to the control information including the persistent resource allocation information from a terminal that has received the control information, wherein the terminal does not transmit an ACK/NACK signal in response to control information including non-persistent resource allocation information, and wherein the persistent resource allocation information indicates a corresponding resource is allocated to the terminal periodically and the non-persistent resource allocation information indicates a corresponding resource is allocated to the terminal in a slot temporarily.

4. The apparatus of claim 3, further comprising a controller for determining whether there is a need for retransmission of the control channel depending on the ACK/NACK signal, and if there is a need for retransmission of the control channel, controlling the data control channel transmission block to retransmit the control information.

* * * * *